(12) United States Patent
Kuwajima

(10) Patent No.: US 7,819,156 B2
(45) Date of Patent: *Oct. 26, 2010

(54) TIRE/WHEEL ASSEMBLY

(75) Inventor: Masatoshi Kuwajima, Hiratsuka (JP)

(73) Assignee: The Yokoyama Rubber Co., Ltd, Tokyo (JP)

( * ) Notice: Subject to any disclaimer, the term of this patent is extended or adjusted under 35 U.S.C. 154(b) by 477 days.

This patent is subject to a terminal disclaimer.

(21) Appl. No.: 10/567,772

(22) PCT Filed: Jun. 8, 2004

(86) PCT No.: PCT/EP2004/007951

§ 371 (c)(1),
(2), (4) Date: Feb. 9, 2006

(87) PCT Pub. No.: WO2005/023566

PCT Pub. Date: Mar. 17, 2005

(65) Prior Publication Data

US 2008/0163966 A1    Jul. 10, 2008

(30) Foreign Application Priority Data

Aug. 27, 2003 (JP) ............................. 2003-302457

(51) Int. Cl.
*B60C 17/00* (2006.01)
*B60C 17/04* (2006.01)
(52) U.S. Cl. ...................................... 152/516; 152/520
(58) Field of Classification Search ................. 152/516, 152/520, 155, 152
See application file for complete search history.

(56) References Cited

U.S. PATENT DOCUMENTS 2,384,402 A * 9/1945 Schubert et. al. ............... 52/750
6,463,974 B1 * 10/2002 Hellweg et al. ............. 152/400
6,843,288 B2 * 1/2005 Seko et al. ................... 152/156

FOREIGN PATENT DOCUMENTS

DE    1232845    * 1/1967

(Continued)

OTHER PUBLICATIONS

International Search Report, Aug. 24, 2004.

*Primary Examiner*—Justin Fischer
(74) *Attorney, Agent, or Firm*—Greer, Burns & Crain, Ltd.

(57) ABSTRACT

Disclosed is a tire/wheel assembly which, even in a case of forming a run-flat support member by processing a metal material high in breaking strength, realizes the forming without generating wrinkles and cracks. In the tire/wheel assembly, a run-flat support member is inserted into a cavity portion of a pneumatic tire mounted onto a rim, a run-flat support member being formed of an annular shell having an arched cross-section, and elastic rings attached to bent ends of the annular shell in an inner peripheral side thereof. In the tire/wheel assembly, while plural notches are provided in the bent ends along a circumferential direction thereof, a length Ln (mm) of the notches in the circumferential direction is set between 1.0 mm and 15.0 mm inclusive, and a ratio Ws/Wg of a width Ws (mm) of the bent ends of the annular shell to a thickness Wg (mm) of the elastic rings is set between 0.55 and 0.92 inclusive.

4 Claims, 1 Drawing Sheet

FOREIGN PATENT DOCUMENTS

| | | |
|---|---|---|
| JP | 10-297226 A1 | 11/1998 |
| JP | 2001-163020 A1 | 6/2001 |
| JP | 2001-519279 A1 | 10/2001 |
| JP | 2003-341312 | 12/2003 |
| JP | 2004-058749 | 2/2004 |
| JP | 2004-075002 | 3/2004 |

* cited by examiner

TIRE/WHEEL ASSEMBLY

TECHNICAL FIELD

The present invention relates to a tire/wheel assembly whereby run-flat traveling is possible, and more specifically, relates to a tire/wheel assembly which, even when a run-flat support member is obtained by forming a material which is high in breaking strength, makes the forming possible without generating wrinkles and cracks thereon.

BACKGROUND ART

A number of technologies, which, even when a tire goes flat while a vehicle is traveling therewith, makes an emergency run possible for about several hundred kilometers, have been proposed. As a representative example thereof, there is a proposal of a tire/wheel assembly (tired wheel) which makes run-flat traveling possible in a manner that, with a core being mounted as a run-flat support member on a rim inside a cavity portion of a pneumatic tire assembled onto the rim, the pneumatic tire in a deflated condition is supported by the run-flat support member (refer to Patent Documents 1, 2 and the like).

The run-flat support member of this tire/wheel assembly is configured by attaching elastic rings, which is formed of hard rubber or the like, to sides facing inner diameters of legs of an annular shell having an arched cross-section, and has an advantage that it can be used with the configuration as it is, without adding substantial modifications to an existing wheel-rim configuration.

Incidentally, the run-flat support member as described above, which includes as a main constituent member, the annular shell having an arched cross-section, is manufactured by forming a cylindrical body formed of a metal sheet into the annular shell through a drawing process in a manner that the cylindrical body is pressed with forming dies (rollers) both from an outer periphery and from an inner periphery thereof while the cylindrical body is rotated.

The thus manufactured run-flat support member can be more enhanced in run-flat durability if a metal material used thereof is higher in breaking strength. However, the higher in breaking strength the metal material is, the more difficult it is to form the material through a drawing process. Because stresses concentrate particularly on inner ends of the two legs of the arched cross-section, there has been a problem that wrinkles, cracks and the like are generated.

Consequently, in the case where the abovementioned run-flat support member constituted of the annular shell is obtained by the drawing process, there is a conflicting relationship between the enhancement in run-flat durability of the run-flat support member and the enhancement of formability (productivity) without generating wrinkles and cracks. Hence, compatible achievement of these issues has been an important problem.

[Patent Document 1] Japanese patent application Kokai publication No. Hei 10-297226
[Patent Document 2] Japanese patent application Kokai publication No. 2001-163020

DISCLOSURE OF THE INVENTION

An object of the present invention is to provide a tire/wheel assembly which, even when a run-flat support member constituted of an annular shell is formed by processing a metal material which is high in breaking strength, makes the forming possible without generating wrinkles and cracks on the run-flat support member.

A tire/wheel assembly of the present invention for achieving the above object is configured as any one of the following (1) to (5):

(1) a tire/wheel assembly, in which a run-flat support member formed of an annular shell and elastic rings is inserted into a cavity portion of a pneumatic tire mounted onto a rim, the annular shell having an arched cross-section, and the elastic rings being attached to bent ends of the annular shell in an inner peripheral side thereof, characterized in that, while plural notches are provided in the bent ends of the annular shell along a circumferential direction of the annular shell, a length Ln of the respective notches in the circumferential direction is set between 1.0 mm and 15 mm inclusive, and a ratio Ws/Wg of a width Ws (mm) of the respective bent ends of the annular shell to a thickness Wg (mm) of the respective elastic rings is set between 0.55 and 0.92 inclusive;

(2) the tire/wheel assembly according to abovementioned (1), characterized in that a ratio Ln/Lp of the length Ln (mm) of the respective notches in the circumferential direction to an alignment pitch Lp (mm) thereof in the circumferential direction is set between 0.07 and 0.30 inclusive, and a ratio Wn/Ws of a length Wn (mm) of the respective notches in a direction orthogonal to the circumferential direction to the width Ws (mm) of the respective bent ends is set between 0.3 and 1.5 inclusive.

(3) the tire/wheel assembly according to abovementioned (2), characterized in that the ratio Ln/Lp of the length Ln (mm) of the respective notches in the circumferential direction to the alignment pitch Lp (mm) thereof in the circumferential direction is set between 0.09 and 0.25 inclusive, and a radius of curvature of each of connecting portions connecting the respective bent ends and sidewall surfaces of the annular shell is set between 4 mm and 10 mm inclusive;

(4) the tire/wheel assembly according to any one of abovementioned (1), (2) and (3), characterized in that the annular shell is formed of a metal material having breaking strength not less than 600 MPa; and (5) the tire/wheel assembly according to abovementioned (3), characterized in that the annular shell is formed of a metal material having breaking strength not less than 800 MPa.

According to the abovementioned tire/wheel assembly of the present invention, by having the annular shell constituting the run-flat support member to be provided with a multiple number of the notches in the bent ends in the inner peripheral side thereof, it becomes possible for the above notches to absorb stresses concentrating on the bent ends in the drawing process. Thereby, even in a case of using a metal material which is high in breaking elongation, forming of the annular shell without generating wrinkles and cracks is possible, whereby, the run-flat support member excellent in run-flat durability can be obtained.

Additionally, by providing the annular shell with the notches, the tire/wheel assembly as a whole can be made lighter in weight.

EXPLANATION OF NUMERALS

Figure 1:
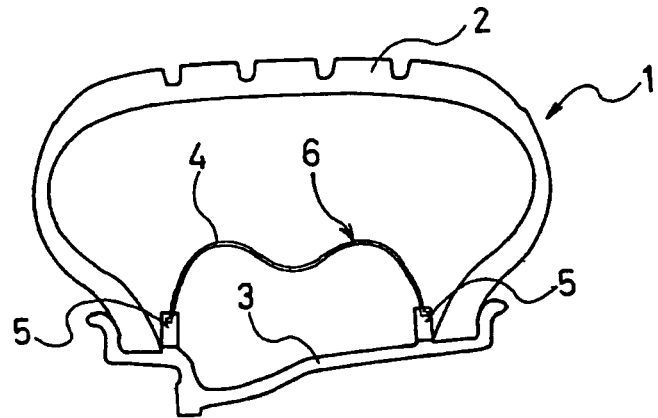
FIG. 1 is a cross-sectional view illustrating an a main portion of a tire/wheel assembly of the present invention, taken along a meridian thereof.

1: tire/wheel assembly
2: pneumatic tire
3: rim
4: annular shell
5: elastic ring
6: ran-flat support member
7: bent end
8: notch

BEST MODE FOR CARRYING OUT THE INVENTION

In the present invention, a run-flat support member is mainly constituted of an annular shell having an arched cross-section. The run-flat support member is additionally constituted in a manner that: bent ends are formed in ends of both legs of the annular shell in an inner peripheral side of the annular shell, the bent ends being bent outward respectively, and elastic rings formed of hard rubber or the like are fixed to the respective bent ends. This run-flat support member constitutes a tire/wheel assembly when it is assembled onto a rim of a wheel in a manner that it is inserted into a cavity portion of a pneumatic tire. This tire/wheel assembly, when the tire goes flat while a vehicle is traveling therewith, makes run-flat traveling possible by going into a state where the run-flat support member supports the tire on an outer peripheral surface thereof.

The annular shell of the run-flat support member has a cross-section thereof formed in an arched shape, and forms a support surface of a convex curved surface in an outer peripheral side thereof. A number of the convex curved surfaces may be one or a plural number which is at least two. However, it is preferable that a plural number of the convex curved surfaces be provided. The reason for this is that: a loading supported by the run-flat support member during run-flat traveling can be distributed among the plural convex surfaces, whereby durability of the run-flat support member as a whole can be enhanced.

The above annular shell is manufactured by forming a cylindrical body formed of a metal sheet through a drawing process in a manner that the cylindrical body is strongly pressed with forming dies (rollers) both from an outer periphery and from an inner periphery thereof while the cylindrical body is rotated. It is preferable that, as a main constituent member of the run-flat support member, this annular shell be formed of a metal material which is high in breaking strength. In terms of breaking strength of the metal material, by having a configuration provided with notches described hereinbelow, it is allowed preferably to adopt a metal material having the strength not less than 600 Mpa. More preferably, one having the strength not less than 800 MPa can be adopted. An upper limit of the breaking elongation is 1200 MPa which is an allowable limit for the drawing process. As the favorable metal materials, steel, aluminum alloy and the like can be cited.

Additionally, the elastic rings attached in the inner peripheral side of the annular shell perform a function of supporting the annular shell by abutting a rim sheet. As a material for these elastic rings, hard rubber, an elastic resin, or the like is used, whereby the elastic rings stably support the annular shell by preventing the annular shell from slipping against the rim sheet, as well as reducing shock and vibration received by the annular shell from the tire in a deflated condition.

Hereinbelow, a detailed description will be given of an embodiment of the present invention with reference to the attached drawings.

FIG. 1 is a cross-sectional view showing a main portion of a tire/wheel assembly configured of the embodiment of the present invention, taken along a meridian thereof.

Figure 2:
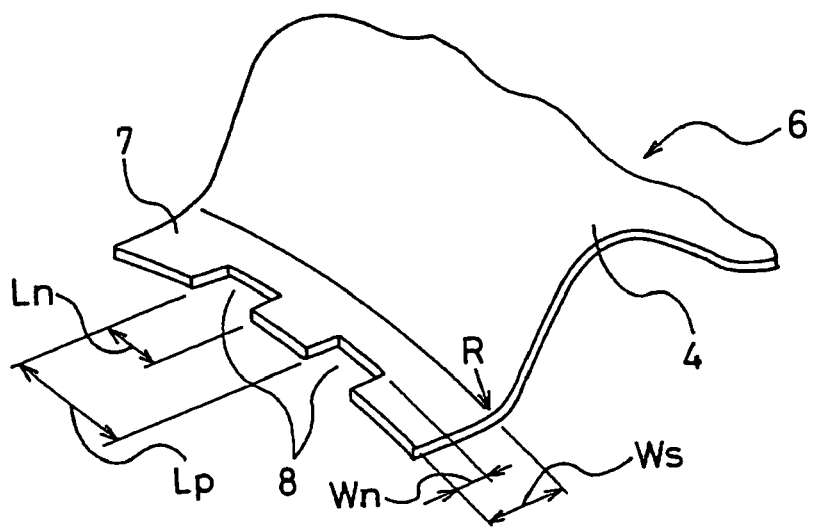
FIG. 2 is a perspective view showing an enlarged view of a main portion in a run-flat support member in FIG. 1.
Figure 3:
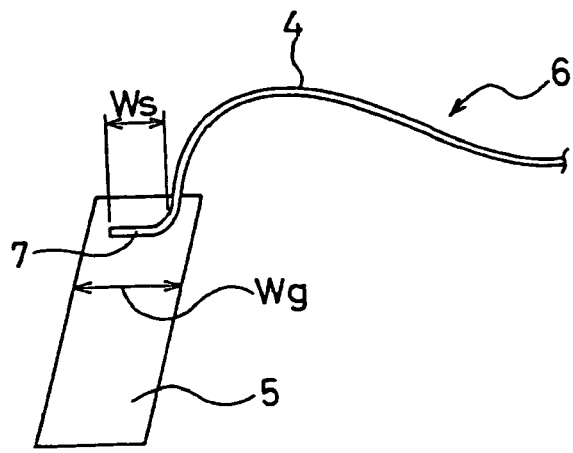
FIG. 3 is a longitudinal cross-sectional view showing the main portion in the run-flat support member in FIG. 1.

A tire/wheel assembly 1 is constituted in a manner that, while a pneumatic tire 2 is mounted onto a rim 3 of a wheel, a run-flat support member 6 is inserted into an inside cavity of the pneumatic tire 2. The run-flat support member 6 is constituted of: an annular shell 4 having an arched cross-section; and elastic rings 5 respectively fixed to legs of the annular shell 4. Specifically, as shown in FIGS. 2 and 3, the annular shell 4 has its cross-sectional shape appearing as a two-pronged arch, bent ends 7, which is bent respectively in opposite outward directions, are formed in end portions of inner diameters of the two legs thereof, and the elastic rings 5 are fixed to these bent ends 7. Additionally, these elastic rings 5, 5 are supported so as to be allowed to abut left and right sides respectively of a rim sheet of the rim 3. The thus mounted pneumatic tire 2 and rim 3 are formed to be annular shapes coaxially with each other, with the common center thereof is an unillustrated rotational axis of the wheel.

In the bent ends 7 in end portion of the inner diameter of the annular shell 4, a multiple number of notches 8 are provided at predetermined intervals along a circumferential direction of the annular shell 4. These respective notches 8 have a length Ln (mm) in the circumferential direction set between 1.0 mm and 15.0 mm inclusive. By making the notches 8 have the length Ln in the circumferential direction at least 1.0 mm, when the annular shell 4 is formed through a drawing process, stresses concentrating on the bent ends 7 are reduced, whereby occurrence of wrinkles and cracks is suppressed. Moreover, weight reduction can be facilitated. Additionally, by making the notches 8 have the length Ln in the circumferential direction not more than 15.0 mm, connection strength of the respective bent ends to the respective elastic rings is secured. The length Ln (mm) of the notches 8 in the circumferential direction here means a length of each of openings, which open, in edges of the respective bent ends 7. A shape for the respective notches 8 may be a rectangle shown in FIG. 2, or otherwise, may be another shape such as a triangle or an arc, and thus is not particularly limited.

The bent ends 7 of the annular shell 4 perform a function of fixing the elastic rings 5, and therefore, if the notches 8 are provided as described above, that leads to reducing the fixing function of the bent ends 7. Accordingly, in order to secure the fixing function of these bent ends 7, with respect to a width Ws (mm) of the respective bent ends 7, it is necessary to set a ratio Ws/Wg thereof to a thickness Wg (mm) of the respective elastic rings 5 to be in a range between 0.55 and 0.92 inclusive. It is more preferable to set Ws/Wg in a range between 0.55 to 0.72 inclusive. Note that the width Ws (mm) of the respective bent ends 7 here means a measurement defined as a length between an intersection and an outer-side edge of one of the bent ends 7, the intersection where an extension of a sidewall surface of the annular shell 4 intersects with an extension of an upper surface of the one of the bent ends 7, the one located in a side of the above sidewall surface.

In the present invention, a length Ln (mm) of the respective notches 8, which is provided in bent ends 7, in the circumferential direction is set between 1.0 mm and 15.0 mm inclusive. However, it is more preferable that the length Ln (mm) of these notches 8 in the circumferential direction be determined by setting Ln/Lp, which is a ratio thereof to an alignment pitch Lp (mm) of the respective notches 8 in the circumferential direction, in a range between 0.07 and 0.30 inclusive, and that a length Wn (depth of the notch) (mm) of the respective notches 8 in a direction orthogonal to the circumferential direction be determined by setting Wn/Ws, which is a ratio thereof to the width Ws (mm) of the respective bent ends 7, in a range between 0.3 and 1.5 inclusive.

By thus configuring the annular shell 4, even in a case where a metal material having breaking strength not less than 600 MPa is used for the annular shell 4, when the annular shell 4 is formed through a drawing process, the process can be preformed without generating wrinkles and cracks. Accordingly, it becomes possible to obtain the run-flat support member whose run-flat durability is still enhanced. Note that, in the above range set for Wn/Ws, the region defined by Wn/Ws>1.0 means any case where each of the notches 8 extends into the sidewall surface of the annular shell 4.

Furthermore, in the present invention, even in a case where a metal material having breaking strength not less than 800 MPa is used for the annular shell 4, a drawing process can be preformed on the annular shell 4 without generating wrinkles and cracks thereon in a manner that: while the ratio Ln/Lp of the length Ln (mm) of the respective notches 8 in the circumferential direction to the alignment pitch Lp (mm) thereof in the circumferential direction is set between 0.09 and 0.25 inclusive, a radius R (refer to FIG. 2) of curvature of each of arcs connecting the respective bent ends 7 and sidewall surfaces of the annular shell 4 is set as large as a value between 4 mm and 10 mm inclusive. With these conditions, it becomes possible to obtain the run-flat support member which is still more excellent in run-flat durability.

EXAMPLES

Examples 1 to 4 and Comparative Examples 1 to 5)

Nine kinds of tire/wheel assemblies (Examples 1 to 4 and Comparative Examples 1 to 5) whose tire size and rim size were 205/55R16 89V and 16×6 1/2JJ respectively were manufactured with a common condition that a metal material formed into an annular shell of each kind was a cold-rolled steel sheet having breaking strength of 600 MPa. They were made different with one another, as shown in Table 1, with respect to a length Ln (mm) of each notch provided in each bend end of the annular shell in a circumferential direction thereof, and with respect to a ratio Ws/Wg of a width Ws (mm) of the bend end to a thickness Wg (mm) of an elastic ring.

For these nine kinds of tire/wheel assemblies, by the following testing methodology, results of the assessment on run-flat durability, workability of the annular shell, and weight are shown respectively in Table 1.

Run-Flat Durability:

A tire of each of the test tire/wheel assemblies was set with a 0 kPa pneumatic pressure inside, and then the tire was mounted onto a front right wheel of a passenger automobile having a displacement of 2500 cc. The other three tires of the automobile were inflated with a 200 kPa pneumatic pressure. Then, the automobile was run by a test driver with a speed of 90 km/h on a circuit track, and a mileage traveled was measured until the test tire/wheel assembly was destroyed. The assessment was preformed by using index numbers obtained by setting a measured value for Comparative Example 1 as 100. A larger value of the index number indicates that the run-flat durability is better.

Formability:

After a drawing process, the annular shell formed was visually inspected in terms of presence of such defects as a wrinkle, a crack and the like. When the defect was found, the test tire/wheel assembly was assessed as "not good" and is represented so in Table 1, and when the defect was not found, the test tire/wheel assembly was assessed as "excellent" and is represented so in Table 1.

Weight:

Weights of the annular shells of the respective test tire/wheel assemblies were taken for the assessment, and they are represented in index numbers obtained by setting a measured value for Comparative Example 1 as 100.

TABLE 1

| | Ln (mm) | Ws/Wg | Formability | Run-flat durability (index number) | Weight (index number) |
|---|---|---|---|---|---|
| Comparative Example 1 | — | 0.80 | Not good | 100 | 100 |
| Comparative Example 2 | 0.8 | 0.80 | Not good | 101 | 100 |
| Example 1 | 1.0 | 0.80 | Excellent | 110 | 100 |
| Example 2 | 10.0 | 0.80 | Excellent | 115 | 98 |
| Comparative Example 3 | 10.0 | 0.53 | Excellent | 95 | 98 |
| Comparative Example 4 | 10.0 | 0.94 | Excellent | 99 | 98 |
| Example 3 | 10.0 | 0.56 | Excellent | 105 | 98 |
| Example 4 | 10.0 | 0.90 | Excellent | 107 | 98 |
| Comparative Example 5 | 17.0 | 0.80 | Excellent | 101 | 97 |

The results are shown in Table 1. As shown in this Table 1, all of the tire/wheel assemblies of Examples 1 to 4 were excellent in formability in a drawing process, were light in weight, and were excellent in run-flat durability.

INDUSTRIAL APPLICABILITY

The tire/wheel assembly of the present invention can be utilized in the tire industry, and by extension can be effectively utilized in the automobile industry as a tire/wheel assembly whereby run-flat traveling becomes possible.

What is claimed is:

1. A tire/wheel assembly in which a run-flat support member formed of an annular shell and elastic rings is inserted into a cavity portion of a pneumatic tire mounted onto a rim, the annular shell having an arched cross-section, and the elastic rings being attached to bent ends of the annular shell on an inner peripheral side of the annular shell,
wherein the bent ends only extend in an axial direction at a uniform radial distance from a central axis,
wherein a plurality of notches are provided in the bent ends of the annular shell along a circumferential direction of the annular shell, a length Ln of the respective notches in the circumferential direction is set between 1.0 mm and 15.0 mm inclusive, and a ratio Ws/Wg of a width Ws (mm) of the respective bent ends of the annular shell to a thickness Wg (mm) of the respective elastic rings is set between 0.55 and 0.92 inclusive,
wherein the annular shell is formed of a metal material, and
wherein a ratio Ln/Lp of the length Ln (mm) of the respective notches in the circumferential direction to an alignment pitch Lp (mm) thereof in the circumferential direction is set between 0.07 and 0.30 inclusive, and a ratio Wn/Ws of a length Wn (mm) of the respective notches in a direction orthogonal to the circumferential direction to the width Ws (mm) of the respective bent ends is set to be greater than or equal to 0.3 but less than 1.0.

2. The tire/wheel assembly according to claim 1, wherein the ratio Ln/Lp of the length Ln (mm) of the respective notches in the circumferential direction to the alignment pitch Lp (mm) thereof in the circumferential direction is set between 0.09 and 0.25 inclusive, and a radius of curvature of each of connecting portions connecting the respective bent ends and sidewall surfaces of the annular shell is set between 4 mm and 10 mm inclusive.

3. The tire/wheel assembly according to any one of claim 1 or 2, wherein the metal material has breaking strength not less than 600 MPa.

4. The tire/wheel assembly according to claim 2, wherein the metal material has breaking strength not less than 800 MPa.

* * * * *